United States Patent
Schmitt

(10) Patent No.: US 7,117,854 B2
(45) Date of Patent: Oct. 10, 2006

(54) RESERVOIR ASSEMBLY HAVING INTERCHANGEABLE FUEL SUCTION UNIT AND FUEL PUMP ASSEMBLY FOR VEHICLES

(75) Inventor: Jochen Schmitt, Weiterstadt (DE)

(73) Assignee: Siemens VDO Automotive Corporation, Auburn Hills ( * ) Notice: Subject to any disclaimer, the term of this patent is extended or adjusted under 35 U.S.C. 154(b) by 275 days.

(21) Appl. No.: 10/886,138

(22) Filed: Jul. 7, 2004

(65) Prior Publication Data

US 2005/0011558 A1    Jan. 20, 2005

Related U.S. Application Data

(60) Provisional application No. 60/487,086, filed on Jul. 14, 2003, provisional application No. 60/507,558, filed on Oct. 1, 2003.

(51) Int. Cl.
*F02M 37/04* (2006.01)
(52) U.S. Cl. ........................ 123/509; 123/497
(58) Field of Classification Search ................ 123/495, 123/497, 509, 510, 514
See application file for complete search history.

(56) References Cited

U.S. PATENT DOCUMENTS

| | | | |
|---|---|---|---|
| 4,546,750 A * | 10/1985 | Brunell et al. ............... | 123/514 |
| 4,763,633 A * | 8/1988 | Nakanishi ................... | 123/514 |
| 5,289,810 A | 3/1994 | Bauer et al. ................ | 123/510 |
| 5,941,279 A | 8/1999 | Frank et al. ................ | 137/574 |
| 6,149,399 A * | 11/2000 | Bowser et al. .............. | 417/279 |
| 6,866,029 B1 * | 3/2005 | Clarkson et al. ............ | 123/509 |
| 6,966,305 B1 * | 11/2005 | Aubree et al. .............. | 123/509 |
| 2002/0112700 A1 | 8/2002 | Iwamoto et al. ............ | 123/509 |

FOREIGN PATENT DOCUMENTS

| DE | 19725939 | 12/1998 |
|---|---|---|
| DE | 19843318 | 4/2000 |

OTHER PUBLICATIONS

PCT International Search Report mailed Dec. 3, 2004.
Patent Cooperation Treaty / PCT Written Opinion of the International Searching Authority.

* cited by examiner

*Primary Examiner*—Thomas Moulis

(57) ABSTRACT

A reservoir assembly 10 is provided for a fuel tank of a vehicle. The reservoir assembly 10 is constructed and arranged to receive an electric fuel pump assembly 44 or a fuel suction unit 23 in a reservoir 12 thereof. The fuel suction unit 23 and the electric fuel pump assembly 44 are configured so as to be interchangeably received in the reservoir 12. This interchangeability advantageously saves design time and, from a supplier's point of view, provides more flexibility since two separate configurations are no longer required.

14 Claims, 6 Drawing Sheets

RESERVOIR ASSEMBLY HAVING INTERCHANGEABLE FUEL SUCTION UNIT AND FUEL PUMP ASSEMBLY FOR VEHICLES

This application is based on U.S. Provisional Application No. 60/487,086, filed on Jul. 14, 2003 and U.S. Provisional Application No. 60/507,558 filed on Oct. 1, 2003 and claims the benefit each provisional application for priority purposes.

FIELD OF THE INVENTION

The invention relates to fuel supply module for automobile vehicles and more particularly, to a reservoir assembly capable of housing a fuel suction unit or a fuel pump assembly for use in a fuel tank of a vehicle.

BACKGROUND OF THE INVENTION

In diesel-fueled vehicles, there is either a fuel suction module or a fuel supply module provided in the fuel tank. The fuel supply module contains an electric driven fuel pump and filter and is configured to supply fuel from a reservoir in the tank to the engine. When the fuel suction module is provided instead of the fuel supply module, the fuel suction module ensures that sufficient fuel is provided in the reservoir such that when the fuel tank is low on fuel, the engine will draw fuel from the reservoir instead of drawing in air. Conventionally, the two modules are completely separate configurations which increases design time and cost.

Thus, there is a need to provide a single assembly with an interchangeable fuel suction unit and fuel pump assembly.

SUMMARY OF THE INVENTION

An object of the invention is to fulfill the need referred to above. In accordance with the principles of the present invention, this objective is achieved by providing a reservoir assembly for a fuel tank of a vehicle. The reservoir assembly is constructed and arranged to receive either an electric fuel pump assembly or a fuel suction unit in a reservoir thereof. The fuel suction unit and the electric fuel pump assembly are configured so as to be interchangeably received in the reservoir.

In accordance with another aspect of the invention, a reservoir assembly for a fuel tank of a vehicle includes a reservoir constructed and arranged to contain fuel. A fuel suction unit is disposed in the reservoir. The fuel suction unit has a filter structure constructed and arranged to filter fuel that passes through at least a portion thereof, and suction tube assembly having a suction tube extending within an interior of the filter structure for drawing filtered fuel from within the interior of the filter structure. The suction tube is constructed and arranged to be in communication an engine of the vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
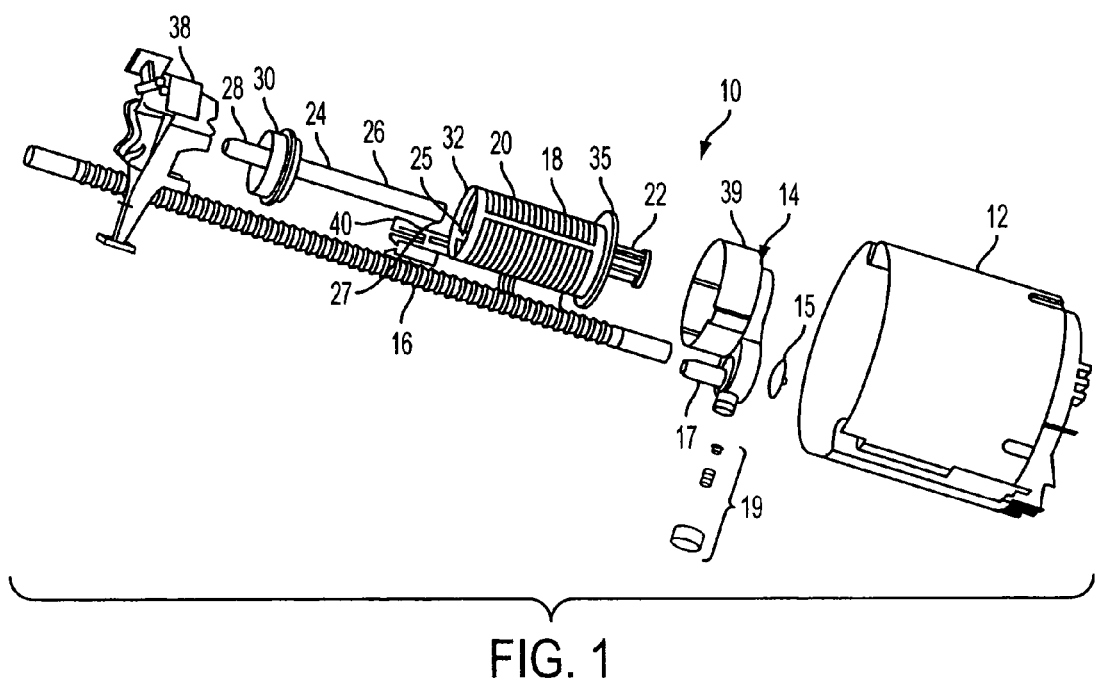
FIG. 1 is an exploded view of a reservoir assembly including a fuel suction unit provided in accordance with the principles of the invention.

With reference to FIG. 1, a reservoir assembly, generally indicated at 10, is shown in exploded view in accordance with the principles of the present invention. The reservoir assembly 10 includes a reservoir 12 for containing fuel such as diesel fuel. A conventional jet pump assembly, generally indicated at 14, is provided in the reservoir 12 and is in communication with an engine (not shown) via tube 16 coupled with a nipple 17. The jet pump assembly 14 includes the conventional spring-loaded check valve assembly 19 and jet pump nozzle (not shown). The jet pump assembly 14 is constructed and arranged to draw fuel from a source of fuel, such as a fuel tank, past valve 15 and into reservoir 12 through an opening in the bottom thereof in the conventional manner.

Figure 6:
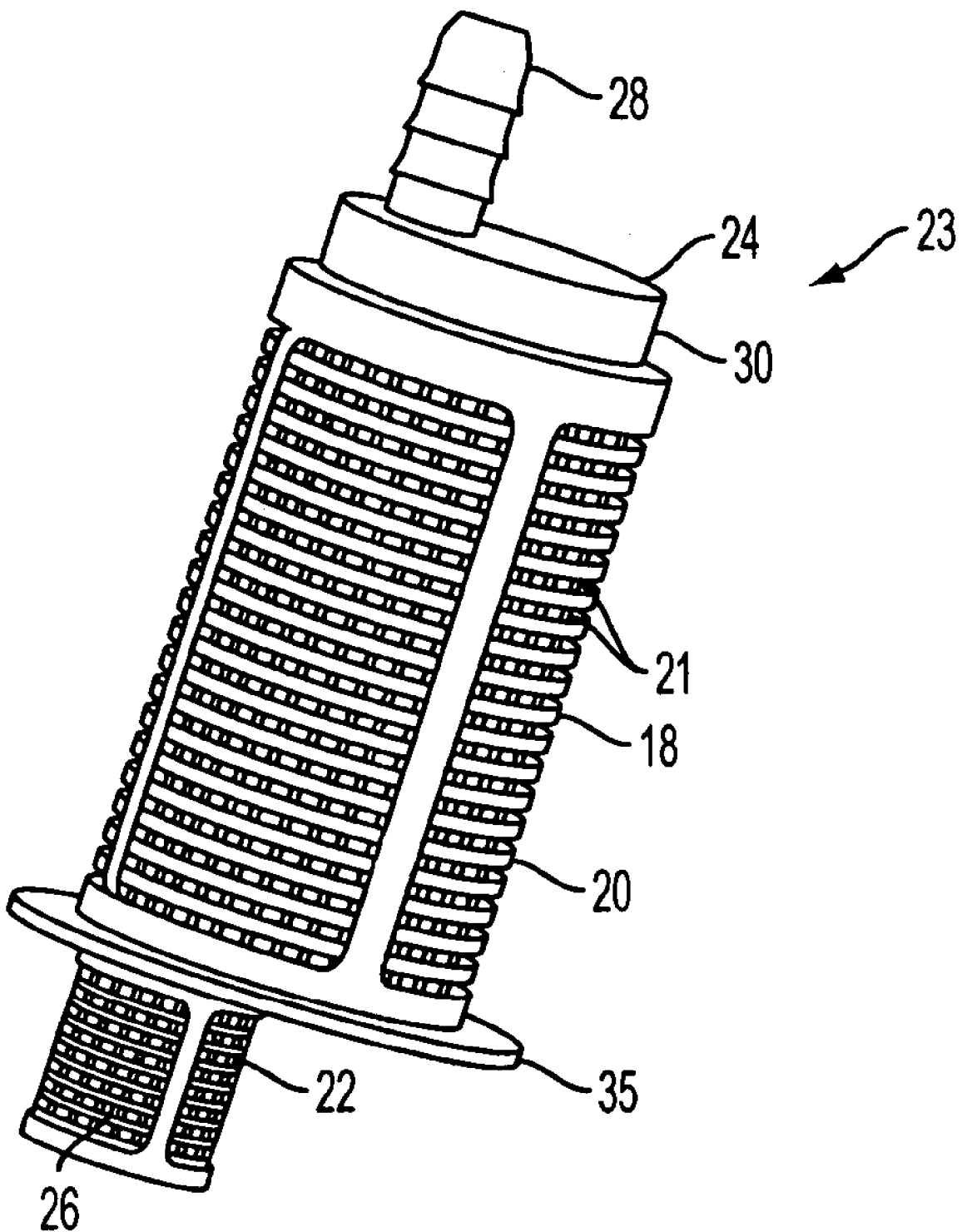
FIG. 6 is an enlarged perspective view of a fuel suction unit of the reservoir assembly of FIG. 1.

With reference to FIGS. 1 and 6, the reservoir assembly 10 includes a fuel suction unit, generally indicated at 23, including a generally cylindrical, hollow filter structure 18 that is preferably completely molded from a plastic material suitable for contacting diesel fuel. The filter structure 18 preferably has a plurality of mesh openings 21 of about 1500 micrometers extending through the periphery for filtering the diesel fuel as the fuel in the reservoir 12 passes through at least a portion of the periphery of the filter structure 18 into interior 25. The filter structure 18 includes a main filter 20 and a suction tube-receiving portion 22 extending therefrom and in fluid communication therewith. The main filter 20 provides the main fuel-filtering function. The suction tube-receiving portion 22 is optional and has a diameter less then the main filter 20 and also provides filtering in a deeper portion of the reservoir 12.

Figure 2:
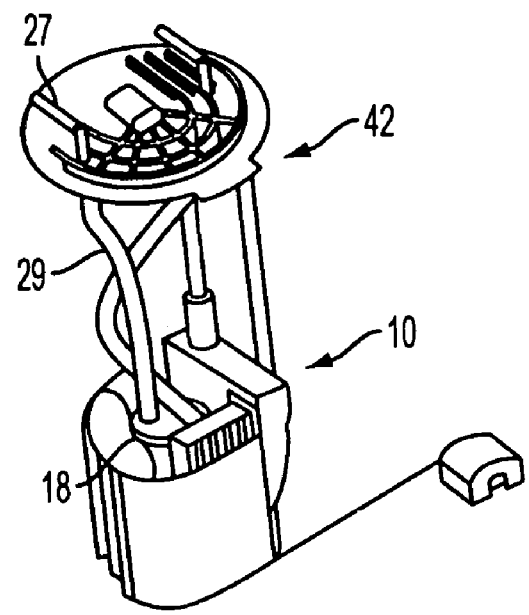
FIG. 2 is a perspective view of a fuel suction module incorporating the reservoir assembly of FIG. 1.

The suction unit 23 also includes a suction tube assembly 24 that includes a suction tube 26, provided in the interior 25 of the filter structure 18, and has an open end 27 extending into the suction tube-receiving portion 22. The suction unit 23 also includes a cover 30 integral with the suction tube 26. An end 28 of the suction tube 26 is in communication with a diesel engine via tubes 27 and 29 (FIG. 2) to supply filtered fuel from reservoir assembly 10 to the engine (not shown).

The cover 30 closes the open end 32 of the filter structure 18 in preferably a snap fit arrangement. In particular, the end 32 of the filter structure 18 includes an annular recess that receives an annular ridge of the cover 30. The suction tube assembly 24, when coupled with the filter structure 18, defines the suction unit 23.

Figure 4:
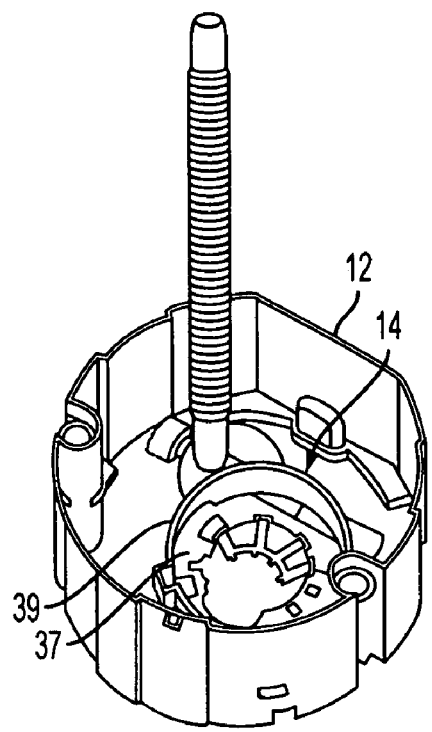
FIG. 4 is a perspective view of a reservoir and jet pump assembly of the reservoir assembly of FIG. 1.

The filter structure 18 also includes and annular flange 35 at a position between the main filter 20 and the suction tube receiving portion 22. The flange 35 is constructed and arranged to support the filter structure 18 on an interior surface 37 of a frame member 39 of the suction jet pump assembly 14 (FIG. 4).

Figure 3:
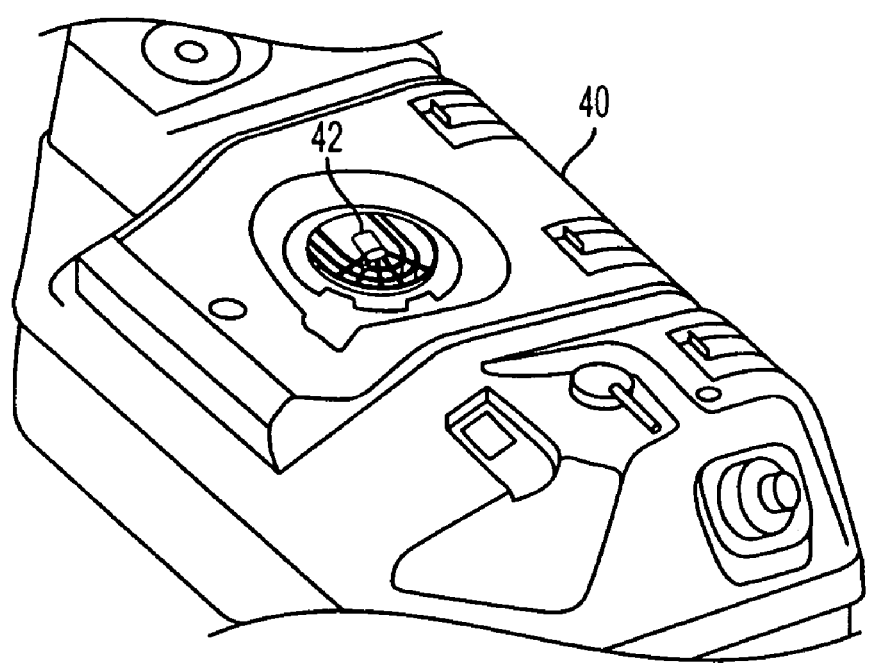
FIG. 3 is a perspective view of a fuel tank of a vehicle incorporating the fuel suction module of FIG. 2.
Figure 5:
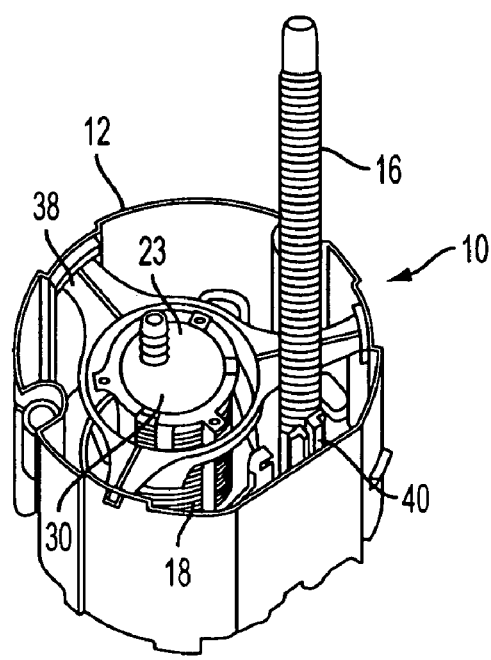
FIG. 5 is a perspective view of the reservoir assembly of FIG. 1 shown in an assembled condition.

A retainer 38 is associated with the suction unit 23 and functions as a support and retainer. The reservoir assembly 10 with suction unit 23 therein is shown in an assembled condition in FIG. 5. The suction unit 23 is part of a fuel suction module, generally indicated at 42 in FIG. 2. The fuel suction module 42 is shown mounted in a fuel tank 40 in FIG. 3.

The function of the suction unit 23 in cooperation with the jet pump 14 is to ensure that fuel is provided in the reservoir 12 to supply fuel to the engine even if the fuel tank 40 contains little fuel. For example, if the fuel tank 40 of FIG. 3 contains little fuel and the vehicle is negotiating a curve, the engine will draw fuel from the reservoir 12 and through the suction unit 23 instead of drawing in air. The suction unit 23 also functions to filter fuel and can also indicated fuel level.

Figure 7:
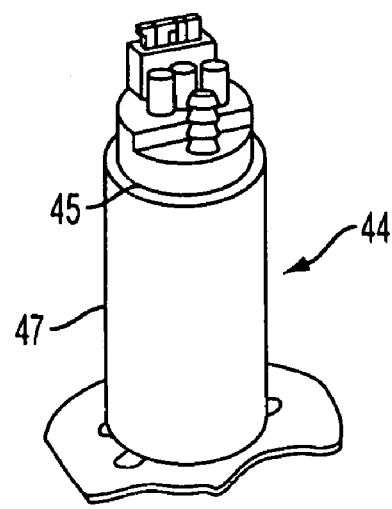
FIG. 7 is a perspective view of an electric fuel pump assembly in accordance with the invention.
Figure 8:
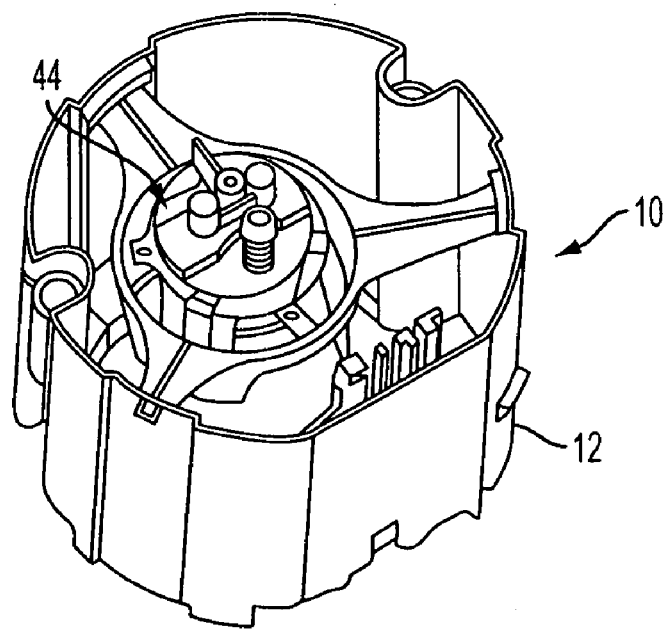
FIG. 8 is a perspective view of the electric fuel pump assembly of FIG. 7 shown in the reservoir assembly of FIG. 4.

In diesel-fueled vehicles, there is either a fuel suction module 42 or a fuel supply module provided it the fuel tank. The difference is that the fuel supply module contains an electric driven fuel pump assembly, generally indicated at 44 in FIG. 7. The fuel pump assembly 44 includes a pump 45 and a filter 47. FIG. 8 shows the fuel pump assembly 44 mounted in a reservoir assembly 10. An advantageous feature of the invention is that the suction unit 23 is configured (e.g., sized and shaped) so that a user can replace it with a fuel pump assembly 44 without changing any other parts of the reservoir assembly 10. Thus, the filter structure 18 of the suction unit 23 has a generally cylindrical configuration of a size substantially similar to the generally cylindrical pump assembly 44. Accordingly, one basic configuration is provided so that it is easy to change from a fuel suction module to a fuel supply module, or vise-versa.

Figure 9:
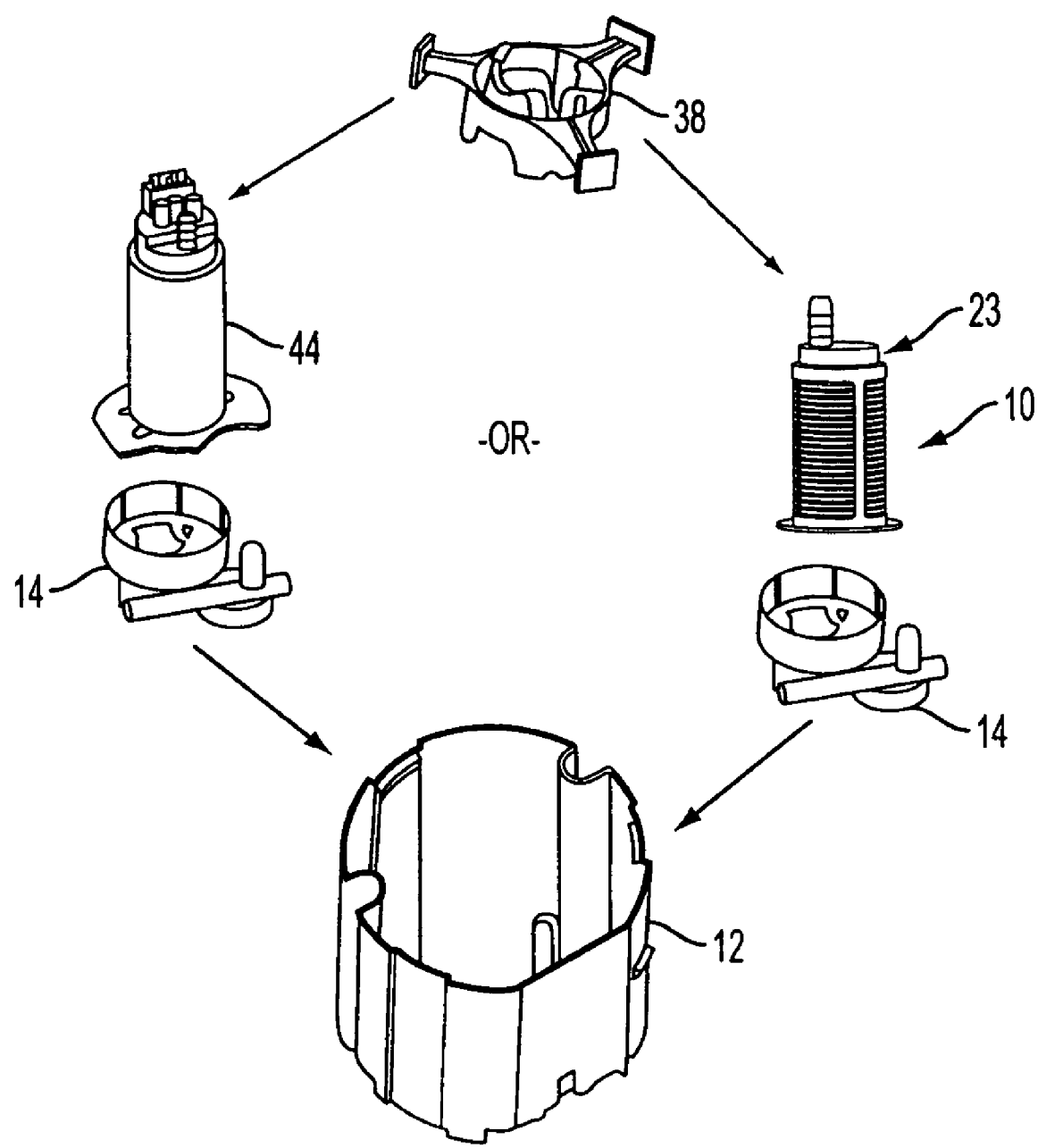
FIG. 9 is a view showing the interchangeability of the electric fuel pump assembly of FIG. 7 and the fuel suction unit of FIG. 6 with respect to a reservoir in accordance with the invention.

FIG. 9 shows the interchangeability of the fuel pump assembly 44 and suction unit 23 in a reservoir 12. This interchangeability advantageously saves design time and, from a supplier's point of view, provides more flexibility.

Although the embodiment is described with reference to diesel fuel, other fuels such as bio-diesel or a mixture of gasoline and diesel can be used.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of providing a reservoir assembly for a fuel tank of a vehicle, the method including the steps of:
providing a reservoir assembly constructed and arranged to receive either an electric fuel pump assembly or a fuel suction unit in a reservoir thereof,
configuring the fuel suction unit and the electric fuel pump assembly so as to be interchangeably received in the reservoir, and
inserting one of the fuel pumb assembly and fuel suction unit in the reservoir,
wherein the fuel pump assembly is configured to have a generally cylindrical periphery and the suction unit includes a filter structure configured to have a generally cylindrical periphery substantially of the same size as periphery of the fuel pump assembly.

2. The method of claim 1, wherein the fuel suction unit and the fuel pump are each configured for diesel fuel.

3. A reservoir assembly for a fuel tank of a vehicle, the reservoir assembly comprising:
a reservoir constructed and arranged to contain fuel,
a fuel suction unit in the reservoir, the fuel suction unit having:
a filter structure constructed and arranged to filter fuel that passes through at least a portion thereof, and
a suction tube assembly having a suction tube extending within an interior of the filter structure for drawing filtered fuel from within the interior of the filter structure, the suction tube being constructed and arranged to be in communication an engine of the vehicle,
wherein the suction tube assembly includes a cover integral with the suction tube, the cover closing an open end of the filter structure.

4. The reservoir assembly of claim 3, wherein the cover and the filter structure are constructed and arranged to be coupled in a snap fit arrangement.

5. The reservoir assembly of claim 3, wherein the filter structure is molded from plastic.

6. The reservoir assembly of claim 3, wherein the filter structure includes a main, generally cylindrical, hollow filter, and a suction tube receiving portion extending from the main portion and in fluid communication therewith.

7. The reservoir assembly of claim 6, wherein the suction tube receiving portion is constructed and arranged to filter diesel fuel.

8. A reservoir assembly for a fuel tank of a vehicle, the reservoir assembly comprising:
a reservoir constructed and arranged to contain fuel,
a fuel suction unit in the reservoir, the fuel suction unit having:
a filter structure constructed and arranged to filter fuel that passes through at least a portion thereof, and
a suction tube assembly having a suction tube extending within an interior of the filter structure for drawing filtered fuel from within the interior of the filter structure, the suction tube being constructed and arranged to be in communication an engine of the vehicle,
wherein the filter structure includes a main, generally cylindrical, hollow filter, and a suction tube receiving portion extending from the main portion and in fluid communication therewith, and
wherein the filter structure includes an annular flange provided between the main portion and the suction tube receiving portion for supporting the filter upon mounting thereof.

9. A reservoir assembly for a fuel tank of a vehicle, the reservoir assembly comprising:
a reservoir constructed and arranged to contain fuel,
a fuel suction unit in the reservoir, the fuel suction unit having:
a filter structure constructed and arranged to filter fuel that passes through at least a portion thereof, and
a suction tube assembly having a suction tube extending within an interior of the filter structure for drawing filtered fuel from within the interior of the filter structure, the suction tube being constructed and arranged to be in communication an engine of the vehicle, wherein the filter structure includes a main, generally cylindrical, hollow filter, and a suction tube receiving portion extending from the main portion and in fluid communication therewith, and wherein an end of the suction tube is received in the suction tube receiving portion.

10. A reservoir assembly for a fuel tank of a vehicle, the reservoir assembly comprising:

a reservoir constructed and arranged to contain fuel, a fuel suction unit in the reservoir, the fuel suction unit having:

a filter structure constructed and arranged to filter fuel that passes through at least a portion thereof, and a suction tube assembly having a suction tube extending within an interior of the filter structure for drawing filtered fuel from within the interior of the filter structure, the suction tube being constructed and arranged to be in communication an engine of the vehicle, wherein the filter structure includes a main, generally cylindrical, hollow filter, and a suction tube receiving portion extending from the main portion and in fluid communication therewith, and wherein the suction tube receiving portion is of hollow, generally cylindrical configuration having a diameter less than that of the main filter.

11. A reservoir assembly for a fuel tank of a vehicle, the reservoir assembly comprising:

a reservoir constructed and arranged to contain fuel, a fuel suction unit in the reservoir, the fuel suction unit having:

a filter structure constructed and arranged to filter fuel that passes through at least a portion thereof, and a suction tube assembly having a suction tube extending within an interior of the filter structure for drawing filtered fuel from within the interior of the filter structure, the suction tube being constructed and arranged to be in communication an engine of the vehicle, further including a jet pump assembly constructed and arranged to draw fuel into the reservoir, the jet pump assembly including a frame member, the fuel suction unit being carried by the frame member.

12. The reservoir assembly of claim 11, wherein the filter structure includes a flange, the flange engaging a surface of the frame member.

13. A fuel suction unit for a fuel module of a diesel-fueled vehicle, the fuel suction unit comprising:

a filter structure constructed and arranged to filter diesel fuel that passes through at least a portion thereof, and a suction tube assembly having a suction tube extending within an interior of the filter structure for drawing filtered diesel fuel from within the interior of the filter structure, the suction tube being constructed and arranged to be in communication an engine of the diesel-fueled vehicle.

wherein the filter structure is of hollow, generally cylindrical configuration having an open end, a periphery of the filter structure including a plurality of openings there-through for filtering diesel fuel, wherein the suction tube assembly includes a cover integral with the suction tube, the cover closing the open end of the filter structure.

14. The reservoir assembly of claim 3, wherein the fuel is diesel.

* * * * *